(12) United States Patent
Mizusawa et al.

(10) Patent No.: US 8,796,643 B2
(45) Date of Patent: Aug. 5, 2014

(54) RADIOGRAPHIC IMAGE ERASING DEVICE

(71) Applicant: FUJIFILM Corporation, Tokyo (JP)

(72) Inventors: Takahiko Mizusawa, Ashigarakami-gun (JP); Hiromi Ishikawa, Ashigarakami-gun (JP); Kazuoki Komiyama, Ashigarakami-gun (JP); Tomoki Inoue, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 71 days.

(21) Appl. No.: 13/672,373

(22) Filed: Nov. 8, 2012

(65) Prior Publication Data

US 2013/0119278 A1    May 16, 2013

(30) Foreign Application Priority Data

Nov. 11, 2011 (JP) ................... 2011-247748

(51) Int. Cl.
*G03B 42/02* (2006.01)
(52) U.S. Cl.
USPC .................... 250/484.4; 250/483.1
(58) Field of Classification Search
CPC .............................. G01T 1/2016; G03B 42/02
USPC .................. 250/484.4, 483.1, 488.1
See application file for complete search history.

(56) References Cited

U.S. PATENT DOCUMENTS

| 4,258,264 A | 3/1981 | Kotera et al. | |
| 4,883,961 A * | 11/1989 | Arakawa et al. | 250/584 |
| 5,065,021 A * | 11/1991 | Arakawa | 250/588 |

FOREIGN PATENT DOCUMENTS

| JP | 55-12429 A | 1/1980 |
| JP | 5-119412 A | 5/1993 |
| JP | H09-090531 A | 4/1997 |
| JP | H11-352615 A | 12/1999 |
| JP | 2005-266099 A | 9/2005 |
| JP | 2005-275297 A | 10/2005 |
| JP | 2006-162637 A | 6/2006 |

OTHER PUBLICATIONS

Decision to Grant a Patent for Japanese Application No. 2011-247748, dated Nov. 19, 2013, with English Language Translation.

* cited by examiner

*Primary Examiner* — David Porta
*Assistant Examiner* — Kenneth J Malkowski
(74) *Attorney, Agent, or Firm* — Birch, Stewart, Kolasch & Birch, LLP

(57) ABSTRACT

A radiographic image erasing device includes: a first light source that applies first erase light including a wavelength in the ultraviolet region to a storage phosphor sheet in which a radiographic image has been stored and recorded; a second light source that is placed at a height identical to that of the first light source and applies second erase light including a wavelength of a longer wavelength than that of the first erase light to the storage phosphor sheet to which the first erase light has been applied; drive mechanisms that switch the orientations or positions of the first light source and the second light source; and a controller that controls the drive mechanisms in accordance with a conveyance direction of the storage phosphor sheet such that the first erase light and the second erase light are applied in this order to the storage phosphor sheet.

20 Claims, 15 Drawing Sheets

A

B

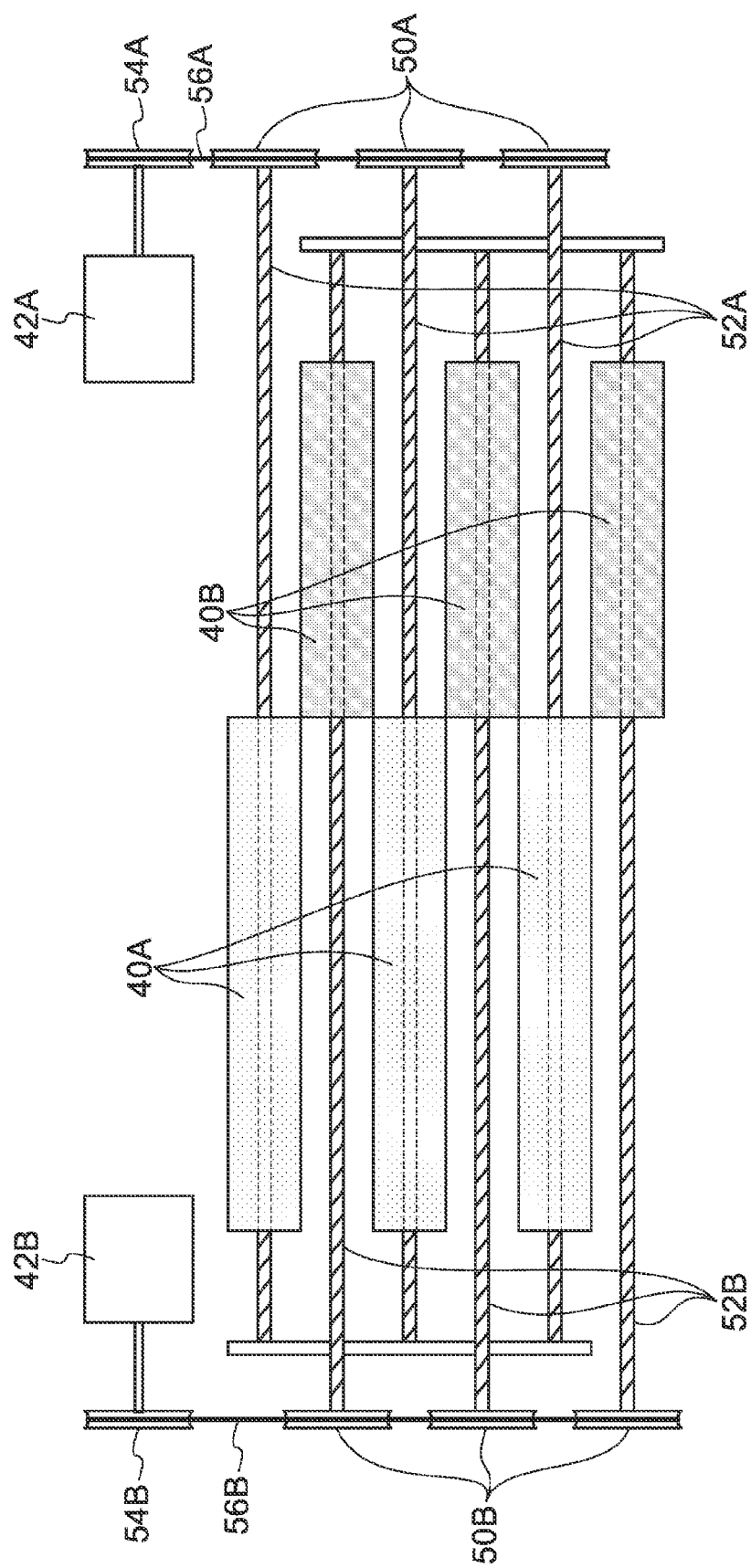

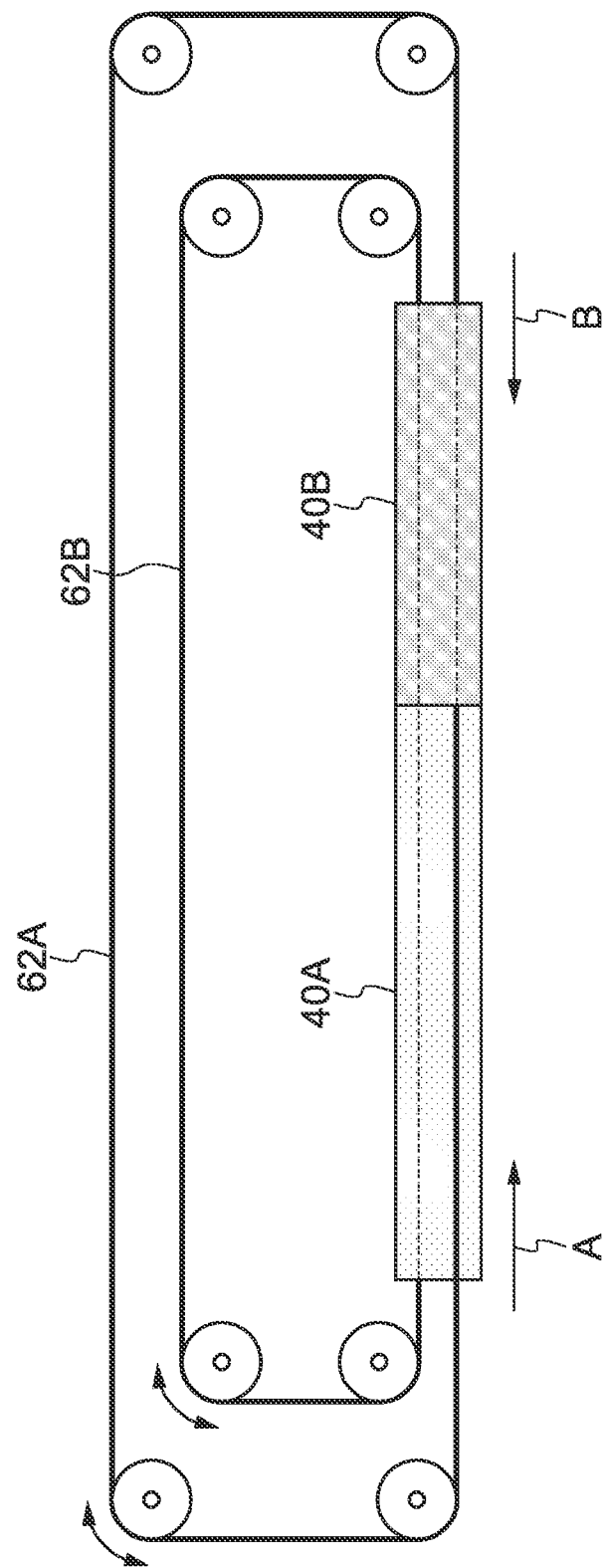

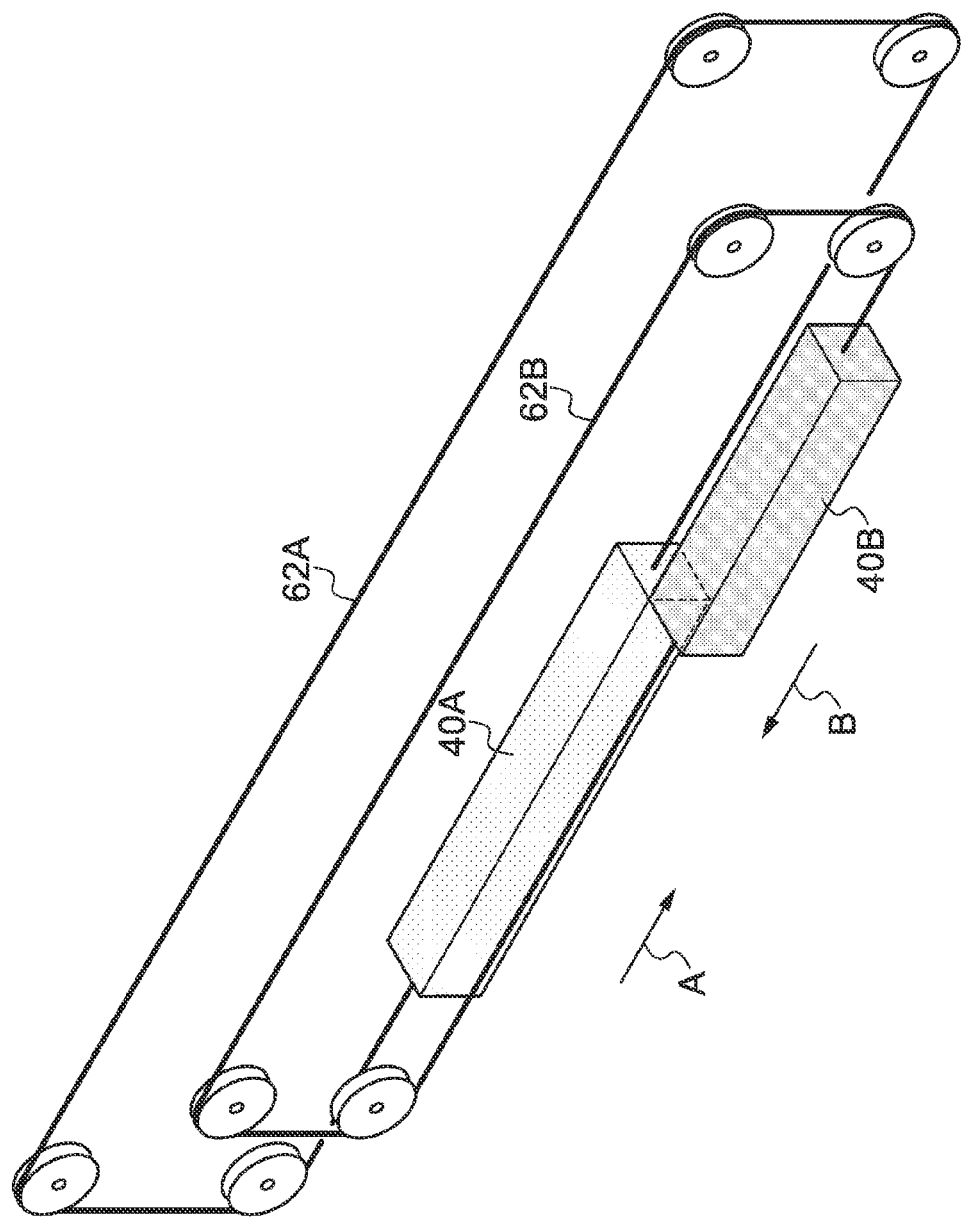

RADIOGRAPHIC IMAGE ERASING DEVICE

CROSS-REFERENCE TO RELATED APPLICATION

This application claims priority under 35 USC 119 from Japanese Patent Application No. 2011-247748 filed Nov. 11, 2011, the disclosure of which is incorporated by reference herein.

BACKGROUND

1. Field of the Invention

The present invention pertains to a radiographic image erasing device and particularly relates to a radiographic image erasing device, a radiographic image erasing program, and a radiographic image reading and erasing device that erase a radiographic image recorded in a storage phosphor sheet.

2. Related Art

When radiation (X-rays, α rays, β rays, γ rays, ultraviolet rays, an electron beam, etc.) is applied to certain types of phosphors, some of the energy of this radiation is stored in the phosphors, and when excitation light such as visible light is applied to the phosphors thereafter, the phosphors exhibit photostimulated luminescence in response to the stored energy.

Phosphors that exhibit this property are called storage phosphors or photostimulable phosphors. To date, various storage phosphors have been known, and as representative examples, barium halide phosphors that are activated by a rare-earth element such as europium and oxyhalide phosphors that are activated by a rare-earth element such as cerium are known. Further, storage phosphors in which various additives have been introduced to those phosphors are also known.

A method that forms the storage phosphor into a sheet, either using a binder or not using a binder, to make a storage phosphor sheet, uses the storage phosphor sheet to record radiographic image information relating to the human body or the like, scans the storage phosphor sheet with excitation light to cause the storage phosphor sheet to be photostimulated and emit light, photoelectrically reads the photostimulated luminescence to obtain image signals, and next processes the image signals to obtain an image with good diagnostic suitability has been proposed as a radiographic image recording and reproducing method (e.g., Japanese Patent Application Laid-Open No. 55-12429 (patent document 1)). In this radiographic image recording and reproducing method, it is described that in order to separate the wavelength regions of the excitation light and the photostimulated luminescence light and efficiently detect the extremely weak photostimulated luminescence light, detecting photostimulated luminescence light of 300 to 500 nm with excitation light in the wavelength region of 600 to 700 nm is preferred, and for this reason a storage phosphor that emits photostimulated luminescence light of 300 to 500 nm when the storage phosphor is excited with light of 600 to 700 nm is preferably used. The storage phosphor sheet has many forms, such as a general sheet-like storage phosphor sheet, a storage phosphor sheet formed in the shape of a belt, or a storage phosphor sheet formed in the shape of a drum, but in the present specification these will be collectively called "sheets".

Radiographic images that have been stored and recorded in the storage phosphor sheets can be erased, so the storage phosphor sheets have the advantage that they can be repeatedly used. Consequently, in radiographic image recording and reproducing methods, the storage phosphor sheet is generally repeatedly used. However, if excitation light of a sufficient intensity is applied at the time when the radiographic image that has been stored and recorded is read from the storage phosphor sheet, the stored radiation energy corresponding to the radiographic image information that had been recorded is released to the outside and should disappear, but in actuality the stored radiation energy cannot be completely erased by only the excitation light that is applied at the time of the reading. Consequently, when the storage phosphor sheet is repeatedly used, there is the problem that the radiographic image that was captured the previous time remains and becomes noise in the radiographic image that is formed the next time.

Further, miniscule amounts of radioactive isotopes such as Ra and K are mixed in the storage phosphor sheet, so because of radiation radiated from these radioactive isotopes, the storage phosphor sheet stores radiation energy even when left unattended, and this also causes noise. Moreover, radiation energy is stored in the storage phosphor sheet because of environmental radiation such as cosmic radiation and radiation from radioactive isotopes in the environment. The radiation energy (called "fog") that is stored while the storage phosphor sheet is left unattended also becomes noise with respect to the radiographic image that is captured the next time, so this fog must also be erased before the next imaging.

In the above-described radiographic image recording and reproducing method that repeatedly cyclically uses the storage phosphor sheet, in order to prevent the occurrence of noise resulting from the radiographic image that was captured the previous time and which remains in the storage phosphor sheet and noise resulting from fog, performing an operation that applies light of a wavelength including light in the excitation light wavelength region of the storage phosphor to the storage phosphor sheet to sufficiently release the remaining radiation energy and erase the residual radiographic image before recording new radiographic image information in the storage phosphor sheet is already known.

As the erasing methods, a method that uses a light source that emits light of a relatively long wavelength, such as a tungsten lamp, a halogen lamp, or an infrared lamp, which radiate visible light to infrared light, a method that uses light of a relatively short wavelength of 400 to 600 nm emitted by a fluorescent lamp, a laser light source, a sodium lamp, a neon lamp, a metal halide lamp, or a xenon lamp, and a method that performs erasure one time on the storage phosphor sheet and, immediately before reuse of the storage phosphor sheet, performs erasure a second time with an application amount that is $1/5$ to $3/10,000$ in comparison to the application amount in the first erasure are known. Additionally, it is regarded that erasure particularly in the visible light region is efficient.

However, when erasure is performed with an erase light source that does not at all include a wavelength in the ultraviolet (UV) region, the residual image resulting from trapped electrons whose level is relatively deep and which are difficult to erase with visible light cannot be sufficiently erased. On the other hand, when erasure is performed with erase light that includes many wavelengths in the UV region, the residual image resulting from the deep trapped electrons can be erased, but new trapped electrons end up being formed by the erase light of the wavelengths in the UV region, and the residual image cannot be completely erased.

Consequently, it is extremely difficult to simultaneously erase images resulting from ordinary traps and deep traps and perform efficient and complete erasure, and the reality is that subtle control of the short-wavelength component in the erase light is needed because the effect of the residual image ends up appearing when attempting to subsequently perform highsensitivity imaging. Therefore, a radiographic image erasing method has been proposed which can efficiently erase the residual image resulting from deep traps in addition to the image resulting from ordinary traps by performing erasure with erase light including a wavelength component in the UV region and thereafter performing erasure with erase light of a longer wavelength than the UV region (e.g., JP-A No. 5-119412 (patent document 2)).

However, the invention described in patent document 2 has a configuration that applies the erase light of the long-wavelength component using a filter that cuts the short-wavelength component, so it has the problem that erasure efficiency becomes worse because of light loss caused by transmitting the erase light through the filter.

Further, there are cases where, in order to reliably erase the radiographic image recorded in the storage phosphor sheet, the user would like to performance erasure once and thereafter reverse the conveyance direction of the storage phosphor sheet to perform erasure again.

In this case, as shown in FIG. 14A for example, the device is given a configuration in which short-wavelength light sources 100A and 100B are placed on both sides of a long-wavelength light source 102. In a case where the conveyance direction of a storage phosphor sheet P is the direction of arrow A in the drawing, the short-wavelength light source 100B and the long-wavelength light source 102 are switched on. As shown in FIG. 14B, in a case where the conveyance direction of the storage phosphor sheet P is the direction of arrow B, which is the opposite of the direction of arrow A, the short-wavelength light source 100A and the long-wavelength light source 102 are switched on.

However, in this case, it is necessary to dispose two short-wavelength light sources, but because one of those short-wavelength light sources is not used, there is the problem that light utilization efficiency is poor.

Further, as shown in FIG. 15A for example, in a case where the conveyance direction of the storage phosphor sheet P is the direction of arrow A in the drawing, it is necessary to place a short-wavelength light source 100 on the right side in the drawing and place a long-wavelength light source 102 on the left side. As shown in FIG. 15B, in a case where the conveyance direction of the storage phosphor sheet P is the direction of arrow B, which is the opposite of the direction of arrow A, it is necessary to place the short-wavelength light source 100 on the left side in the drawing and place the long-wavelength light source 102 on the right side.

However, in this case, there is the problem that the thickness of the device ends up increasing because it is necessary to place and interchange the short-wavelength light source 100 and the long-wavelength light source 102 in two stages in the height direction with respect to the storage phosphor sheet P.

SUMMARY

The present invention has been made in order to solve the above-described problem, and it is an object thereof to provide a radiographic image erasing device, a radiographic image erasing program, and a radiographic image reading and erasing device that can erase a radiographic image in accordance with the conveyance direction of the storage phosphor sheet without increasing the thickness of the device.

In order to solve the above-described problem, a radiographic image erasing device pertaining to a first aspect of the invention includes: a first light source that applies first erase light including a wavelength component in the ultraviolet region to a storage phosphor sheet in which a radiographic image has been stored and recorded; a second light source that is placed at a height identical to that of the first light source with respect to the storage phosphor sheet and applies second erase light including a wavelength component of a longer wavelength than that of the wavelength component of the first erase light to the storage phosphor sheet to which the first erase light has been applied by the first light source; drive mechanisms that switch the orientations or positions of the first light source and the second light source; and a controller that controls the drive mechanisms in accordance with a conveyance direction of the storage phosphor sheet in such a way that the first erase light and the second erase light are applied in this order to the storage phosphor sheet.

A radiographic image erasing program pertaining to a tenth aspect of the invention causes a computer to function as the controller of the radiographic image erasing device according to any one of the first to ninth aspects.

A radiographic image reading and erasing device pertaining to an eleventh aspect of the invention includes: a conveyance mechanism that conveys a storage phosphor sheet that has been inserted from an insertion opening; a reading component that reads a radiographic image from the storage phosphor sheet; the radiographic image erasing device according to any one of the first to ninth aspects which erases the radiographic image remaining in the storage phosphor sheet after the radiographic image has been read by the reading component; and a conveyance controller that controls the conveyance mechanism.

BRIEF DESCRIPTION OF THE DRAWINGS

Embodiments of the invention will be described in detail with reference to the following figures, wherein:

FIG. 9 is a plan view of the eraser pertaining to the second embodiment;

FIG. 12 is a side view of an eraser pertaining to a modification of the radiographic image reading and erasing device pertaining to the second embodiment;

FIG. 13 is a perspective view of the eraser pertaining to the modification of the radiographic image reading and erasing device pertaining to the second embodiment;

DETAILED DESCRIPTION

Embodiments of the invention will be described below with reference to the drawings.

First Embodiment

Figure 1:
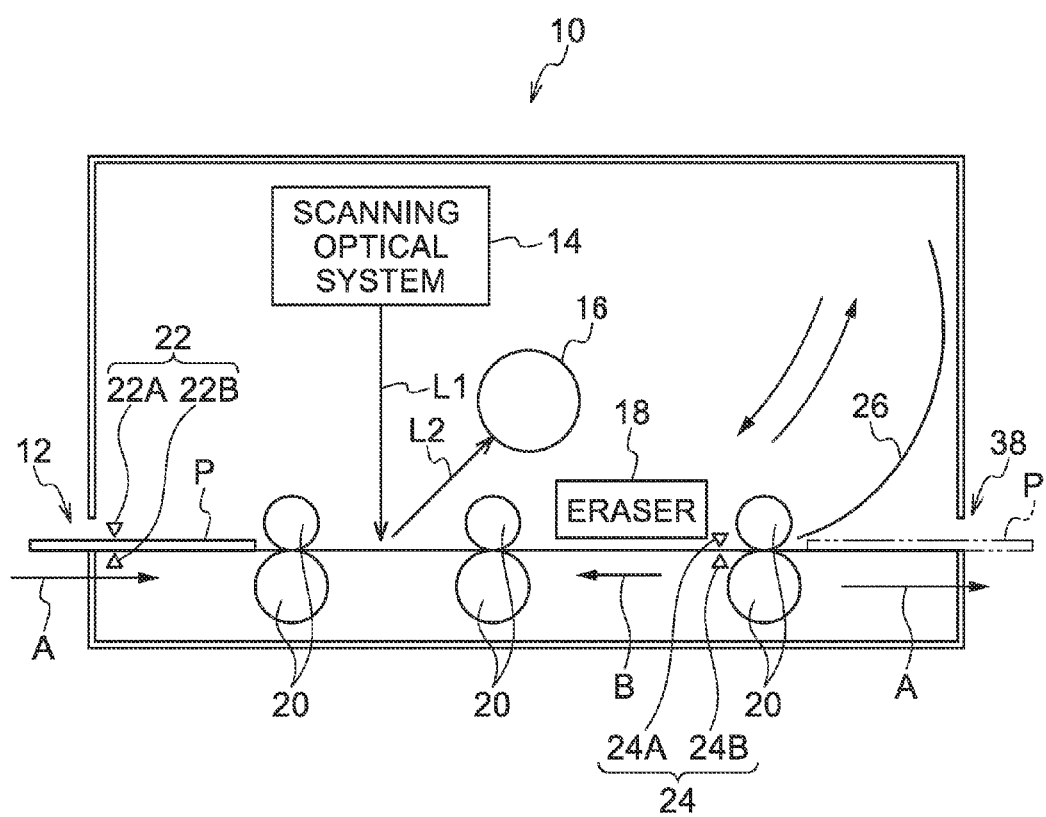
FIG. 1 is a schematic configuration diagram of a radiographic image reading and erasing device pertaining to a first embodiment.

FIG. 1 shows the schematic configuration of a radiographic image reading and erasing device 10 pertaining to the present embodiment. As shown in FIG. 1, the radiographic image reading and erasing device 10 is configured to include a scanning optical system 14, an image reading component 16, an eraser 18, conveyance rollers 20, a first detection sensor 22, and a second detection sensor 24. The scanning optical system 24 scans, with excitation light L1, a storage phosphor sheet P that has been inserted from an insertion opening 12 and in which a radiographic image has been recorded. The image reading component 16 photoelectrically reads, and outputs as image data, photostimulated luminescence light L2 that has been emitted from the storage phosphor sheet P as a result of the excitation light L1 being applied to the storage phosphor sheet P. The eraser 18 erases the radiographic image remaining in the storage phosphor sheet P from which the image has been read. The conveyance rollers 20 convey the storage phosphor sheet P. The first detection sensor 22 and the second detection sensor 24 detect the storage phosphor sheet P.

Further, the radiographic image reading and erasing device 10 has an evacuation area 26 to which the storage phosphor sheet P from which the radiographic image has been erased by the eraser 18 is temporarily evacuated. The radiographic image reading and erasing device 10 has a configuration that can reverse the rotation of the conveyance rollers 20 so that the storage phosphor sheet P that has been temporarily evacuated to the evacuation area 26 can be conveyed in the direction of arrow B, which is the opposite of the direction of arrow A, and the radiographic image still remaining in the storage phosphor sheet P can be erased again by the eraser 18.

The storage phosphor sheet P comprises a storage phosphor that has been formed into a sheet. When radiation (X-rays, α rays, β rays, γ rays, ultraviolet rays, an electron beam, etc.) is applied to the storage phosphor, some of the energy of this radiation is stored in the storage phosphor, and when excitation light in the wavelength region of 400 to 900 nm, for example, is applied to the storage phosphor thereafter, the storage phosphor is photostimulated and emits light of a wavelength of 300 to 500 nm, for example, in response to the stored energy. As the storage phosphor, for example, barium halide phosphors that are activated by a rare-earth element such as europium and oxyhalide phosphors that are activated by a rare-earth element such as cerium are used. The storage phosphor sheet P is used to record a radiographic image relating to the human body or the like, the storage phosphor sheet P is inserted into the radiographic image reading and erasing device 10, and the radiographic image is read. The radiographic image remaining in the storage phosphor sheet P is erased by the eraser 18, so it becomes possible for the storage phosphor sheet P to be reutilized.

Figure 2:
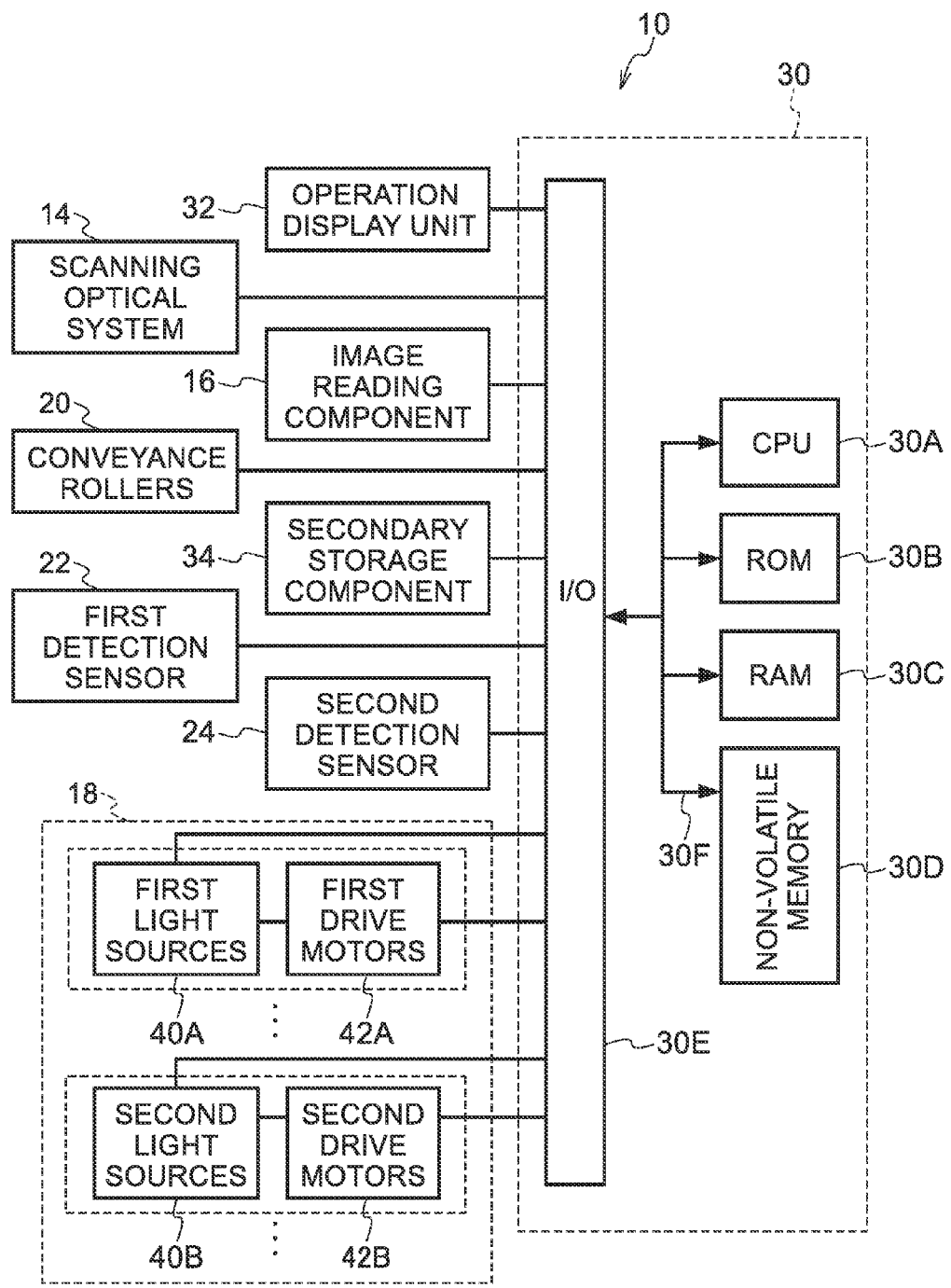
FIG. 2 is a schematic block diagram of an electrical system of the radiographic image reading and erasing device pertaining to the first embodiment.

FIG. 2 is a schematic block diagram of an electrical system of the radiographic image reading and erasing device 10. As shown in FIG. 2, the radiographic image reading and erasing device 10 is configured to include a computer 30.

The computer 30 has a configuration in which a central processing unit (CPU) 30A, a read-only memory (ROM) 30B, a random access memory (RAM) 30C, a non-volatile memory 30D, and an input/output interface (I/O) 30E are interconnected via a bus 30F. A later-described control program is stored in the non-volatile memory 30D.

An operation display unit 32, the scanning optical system 14, the image reading component 16, the conveyance rollers 20, a secondary storage component 34, the first detection sensor 22, the second detection sensor 24, and the eraser 18 are connected to the I/O 30E.

The operation display unit 32 is configured to include a touch panel or the like for displaying various screens such as operation screens for instructing operating modes and setting various parameters, for example. The operating modes include an image reading and erasing mode and an erasing mode, for example. The image reading and erasing mode is a mode in which the radiographic image is read and thereafter erasure is performed one time. The erasing mode is a mode in which erasure is performed two times. In the erasing mode, the radiographic image recorded in the storage phosphor sheet P is erased by the eraser 18, thereafter the storage phosphor sheet P is evacuated to the evacuation area 26, the conveyance direction is reversed, and the radiographic image is erased again by the eraser 18. The types of operating modes are not limited to these.

The scanning optical system 14 is configured to include an excitation light source (not shown in the drawings), which applies the excitation light L1 in the wavelength region of 400 to 900 nm as an example, and a scanning device (not shown in the drawings), which scans the storage phosphor sheet P with the excitation light L1 applied from the excitation light source.

The image reading component 16 is configured to include an imaging element such as a CCD that photoelectrically reads the photostimulated luminescence light L2 that has been emitted from the storage phosphor sheet P as a result of the excitation light L1 being applied to the storage phosphor sheet P.

The conveyance rollers 20 forwardly rotate to convey the storage phosphor sheet P in the direction of arrow A in FIG. 1 and reversely rotate to convey the storage phosphor sheet P in the direction of arrow B, which is the opposite of the direction of arrow A in FIG. 1.

The secondary storage component 34 is configured by a hard disk or a memory card, for example, and stores the image data of the radiographic image that has been read by the image reading component 16.

The first detection sensor 22 is placed in the vicinity of the insertion opening 12 for the storage phosphor sheet P as shown in FIG. 1. The first detection sensor 22 is configured from a light emitting component 22A and a light receiving component 22B that are placed in such a way as to sandwich the conveyance path of the storage phosphor sheet P. Additionally, the first detection sensor 22 can detect that the storage phosphor sheet P has passed between the light emitting component 22A and the light receiving component 22B when the light emitted from the light emitting component 22A goes from being detected by the light receiving component 22B to being undetected by the light receiving component 22B.

The second detection sensor 24 is placed in the vicinity of the downstream side of the eraser 18 in the direction of arrow A as shown in FIG. 1. Like the first detection sensor 22, the second detection sensor 24 is also configured from a light emitting component 24A and a light receiving component 24B that are placed in such a way as to sandwich the conveyance path of the storage phosphor sheet P.

Further, the distance between the first detection sensor 22 and the second detection sensor 24 on the conveyance path of the storage phosphor sheet P is a predetermined length X. Additionally, the evacuation area 26 is configured in such a way that the storage phosphor sheet P equal to or less than the length X can be evacuated to the evacuation area 26.

For this reason, in the present embodiment, in a case where the storage phosphor sheet P is being detected also by the first detection sensor 22 when the storage phosphor sheet P has been detected by the second detection sensor 24, the storage phosphor sheet P exceeds the length X and cannot be evacuated to the evacuation area 26, so control is performed in such a way that the storage phosphor sheet P is discharged from a discharge opening 38. On the other hand, in a case where the storage phosphor sheet 22 is not being detected by the first detection sensor 22 when the storage phosphor sheet P has been detected by the second detection sensor 24, the storage phosphor sheet P is equal to or less than the length X and can be evacuated to the evacuation area 26, so control is performed in such a way as to cause the storage phosphor sheet P to be temporarily evacuated to the evacuation area 26 and cause the conveyance rollers 20 to reversely rotate to convey the storage phosphor sheet P in the direction of arrow B, which is the opposite of the direction of arrow A, so that the storage phosphor sheet P is discharged from the insertion opening 12.

The eraser 18 is configured to include plural first light sources 40A, plural drive motors 42A that drive the plural first light sources 40A, plural second light sources 40B, and plural drive motors 42B that drive the plural second light sources 40B.

Figure 3:
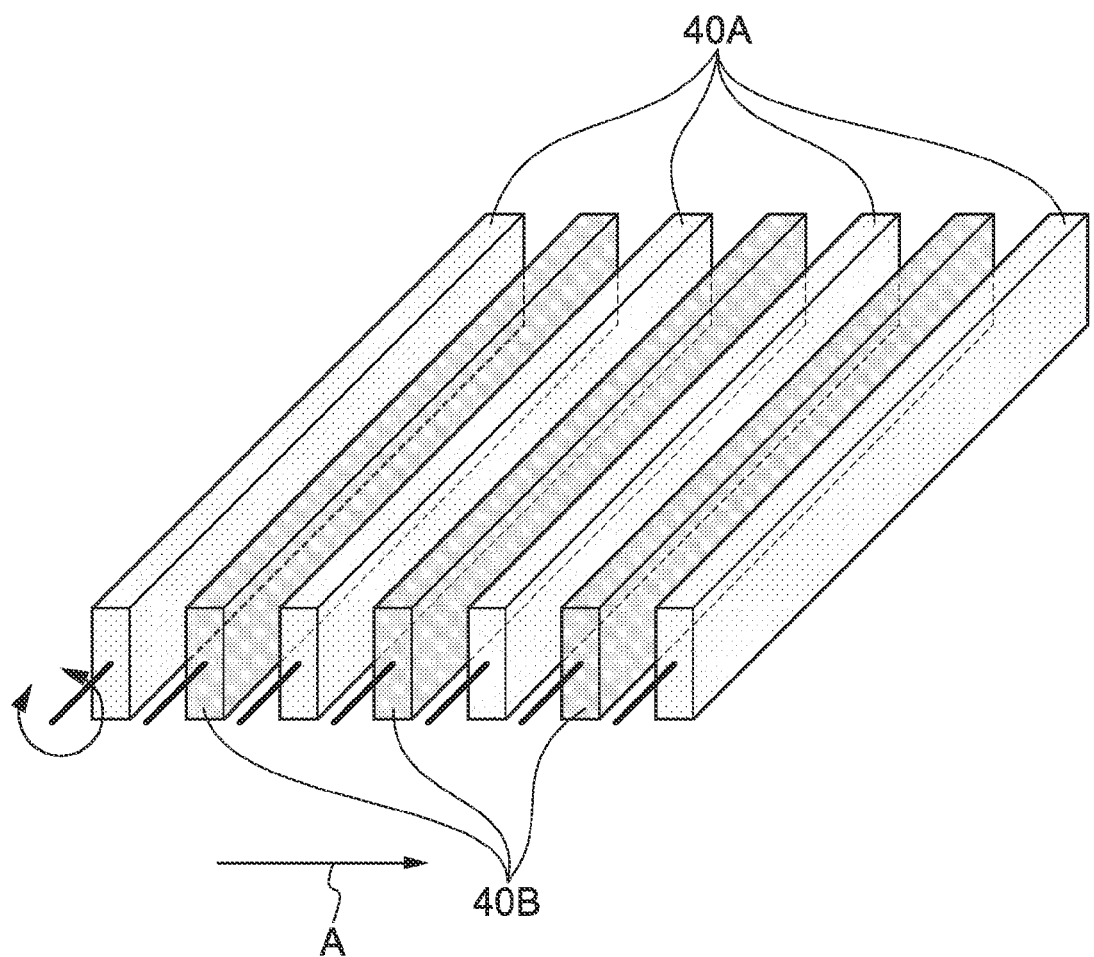
FIG. 3 is a perspective view of an eraser pertaining to the first embodiment.

FIG. 3 is a perspective view of the eraser 18. As shown in FIG. 3, the first light sources 40A and the second light sources 40B are rectangular strip-like light sources that take as their lengthwise direction a direction that intersects (in the present embodiment, a direction that is orthogonal to) the direction of arrow A, which is the conveyance direction of the storage phosphor sheet P. Further, the first light sources 40A and the second light sources 40B are placed at a height (3 to 4 cm as an example) where the light emitted from these light sources is applied across the entire region of the width direction (a direction that is orthogonal to the direction of arrow A) of the storage phosphor sheet P. Further, the first light sources 40A and the second light sources 40B are placed alternately at an approximately identical height with respect to the storage phosphor sheet P. The "identical height" here is not limited to being a completely identical height and also includes cases where the heights deviate by a certain amount. Further, the radiographic image reading and erasing device 10 may also be given a configuration in which a light diffuser plate is disposed between the first light sources 40A and second light sources 40B and the storage phosphor sheet P.

The first light sources 40A apply, to the storage phosphor sheet P, first erase light including a wavelength component in a range that includes a short-wavelength component, such as a range of at least 400 nm to 450 nm, for example. It suffices for the light applied from the first light sources 40A to at least include light of a short wavelength, and the light applied from the first light sources 40A may include, in addition to light of a short wavelength, light of a long wavelength excluding the short wavelength. As the first light sources 40A, for example, LEDs, various fluorescent lamps, mercury lamps, metal halide lamps, and ultraviolet lamps can be used.

The second light sources 40B apply, to the storage phosphor sheet P, second erase light including a longer wavelength component than the first erase light. The second erase light is light (excluding the wavelength component of the first erase light) including a wavelength component in a range including a wavelength component in the neighborhood of 600 nm, such as a range of 500 nm to 700 nm, for example. As the second light sources 40B, the aforementioned light sources that can be used as the first light sources 40A, but excluding the ultraviolet lamps, can be used.

Further, as shown in FIG. 3, the plural first light sources 40A and the plural second light sources 40B are placed alternately in a direction along the direction of arrow A. Additionally, the light sources are driven to rotate independently by the first drive motors 42A and the second drive motors 42B.

Figure 4A:
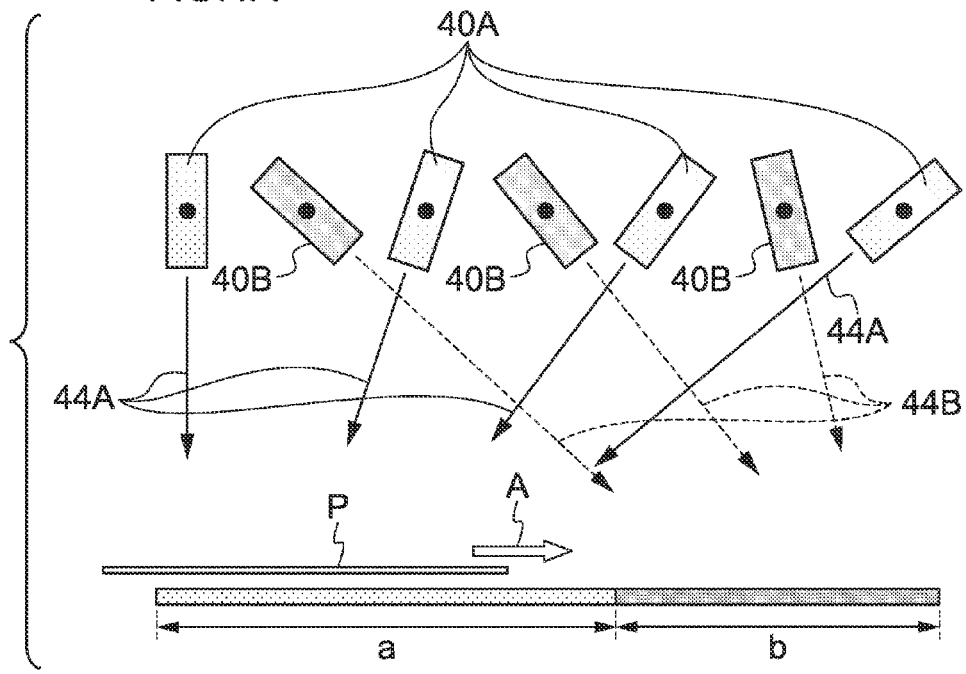
FIGS. 4A and 4B are diagrams for describing the orientations of first light sources and second light sources of the eraser pertaining to the first embodiment.

Additionally, as shown in FIG. 4A, in a case where the storage phosphor sheet P is conveyed in the direction of arrow A, the angles of rotation of the plural first light sources 40A and the plural second light sources 40B are controlled in such a way that first erase light 44A from the plural light sources 40A is applied to the upstream side in the direction of arrow A and second erase light 44B from the plural second light sources 40B is applied to the downstream side in the direction of arrow A.

Figure 4B:
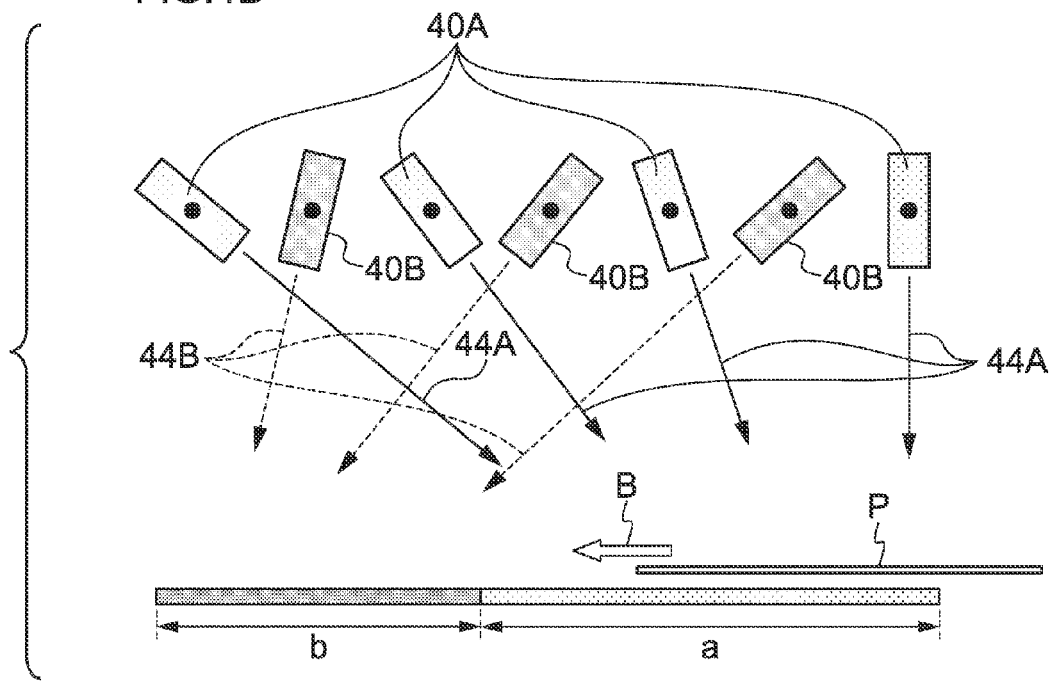

Further, as shown in FIG. 4B, in a case where the storage phosphor sheet P is conveyed in the direction of arrow B, which is the opposite of the direction of arrow A, the angles of rotation of the plural first light sources 40A and the plural second light sources 40B are controlled in such a way that the first erase light 44A from the plural light sources 40A is applied to the upstream side in the direction of arrow B and the second erase light 44B from the plural second light sources 40B is applied to the downstream side in the direction of arrow B.

Because of this, the first erase light 44A of the short wavelength is first applied to the storage phosphor sheet P, whereby the residual image resulting from deep trapped electrons is erased. Thereafter, the second erase light 44B of the longer wavelength is applied to the storage phosphor sheet P, whereby the residual image resulting from trapped electrons that have been newly formed by the application of the first erase light 44A can be erased.

An area ratio b/a of the area of a region a in which the second erase light 44B is applied with respect to the area of a region b in which the first erase light 44A is applied—that is, a light amount ratio b/a of a light amount b of the second erase light 44B with respect to a light amount a of the first erase light 44A—is, for example, 10/90 to 80/20, more preferably 15/85 to 60/40, and particularly preferably 20/80 to 50/50.

Further, it is not invariably necessary for the plural first light sources 40A and the plural second light sources 40B to be placed alternately. In this case, the eraser 18 may be given a configuration in which, for example, the numbers of each of the plural first light sources 40A and the plural second light sources 40B are numbers corresponding to the light amount ratio b/a, the plural first light sources 40A and the plural second light sources 40B are put into sets in accordance with the light amount ratio b/a (so that, for example, two of the first light sources 40A and one of the second light sources 40B form one set), and the sets are placed alternately.

It is preferred that the light applied from the first light sources 40A and the second light sources 40B have appropriate degrees of directionality. Specifically, it is preferred that the light applied from the first light sources 40A and the second light sources 40B have directionalities to the extent that the directionalities are not so low that the light diffuses and the wavelengths mix together or, conversely, the directionalities are not so high that application unevenness becomes greater. Consequently, for example, when using lamps whose directionality is low for the first light sources 40A and the second light sources 40B, lenses or the like may be used to raise the directionalities so that the light applied to the storage phosphor sheet P has appropriate degrees of directionality.

Next, processing executed by the CPU 30A of the computer 30 will be described as the action of the present embodiment with reference to the flowcharts shown in FIG. 5 and FIG. 6. The processing shown in FIG. 5 and FIG. 6 is executed as a result of the CPU 30A reading the control program stored in the non-volatile memory 30D.

Figure 5:
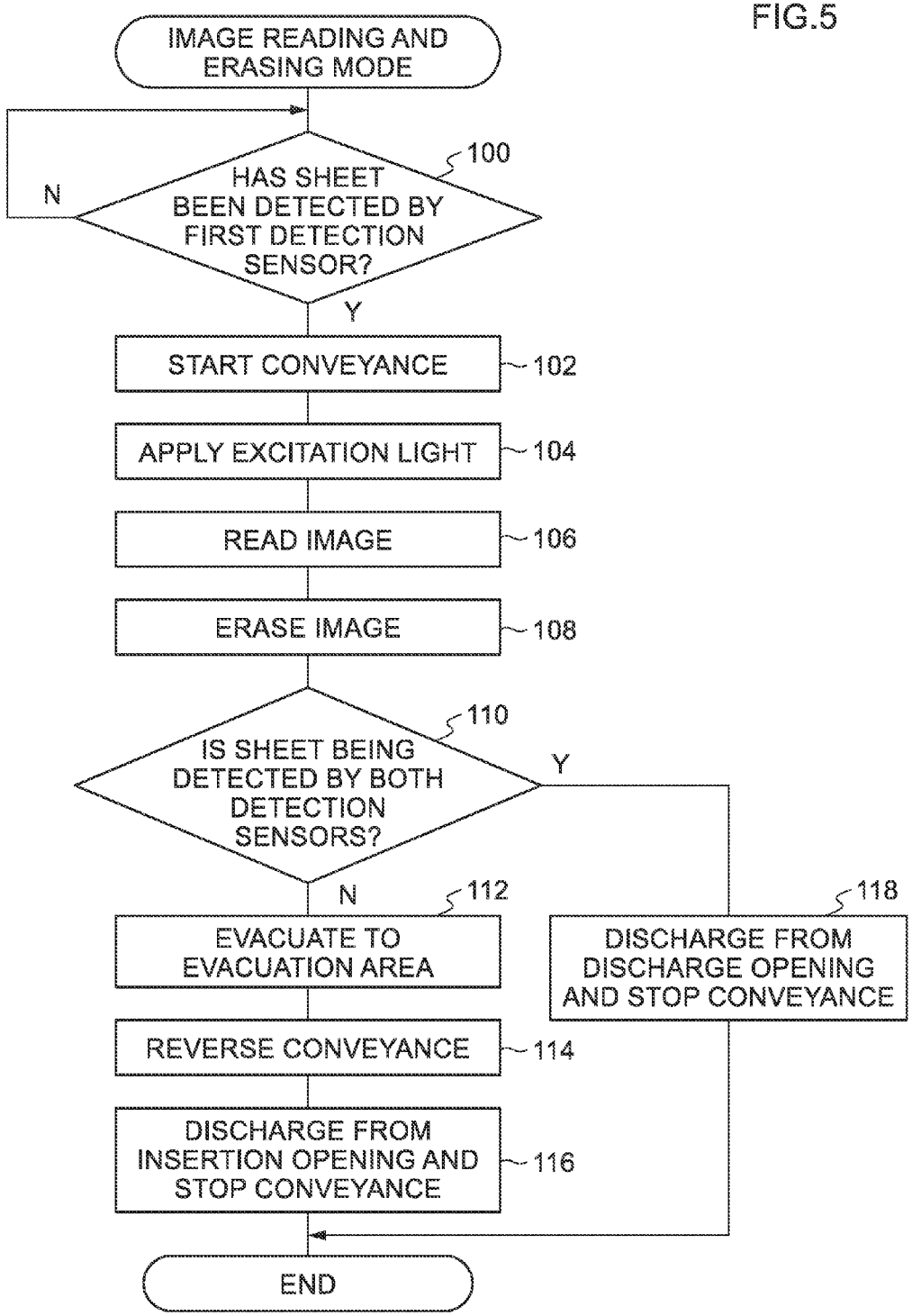
FIG. 5 is a flowchart of processing executed by a CPU of the radiographic image reading and erasing device pertaining to the first embodiment.
Figure 6:
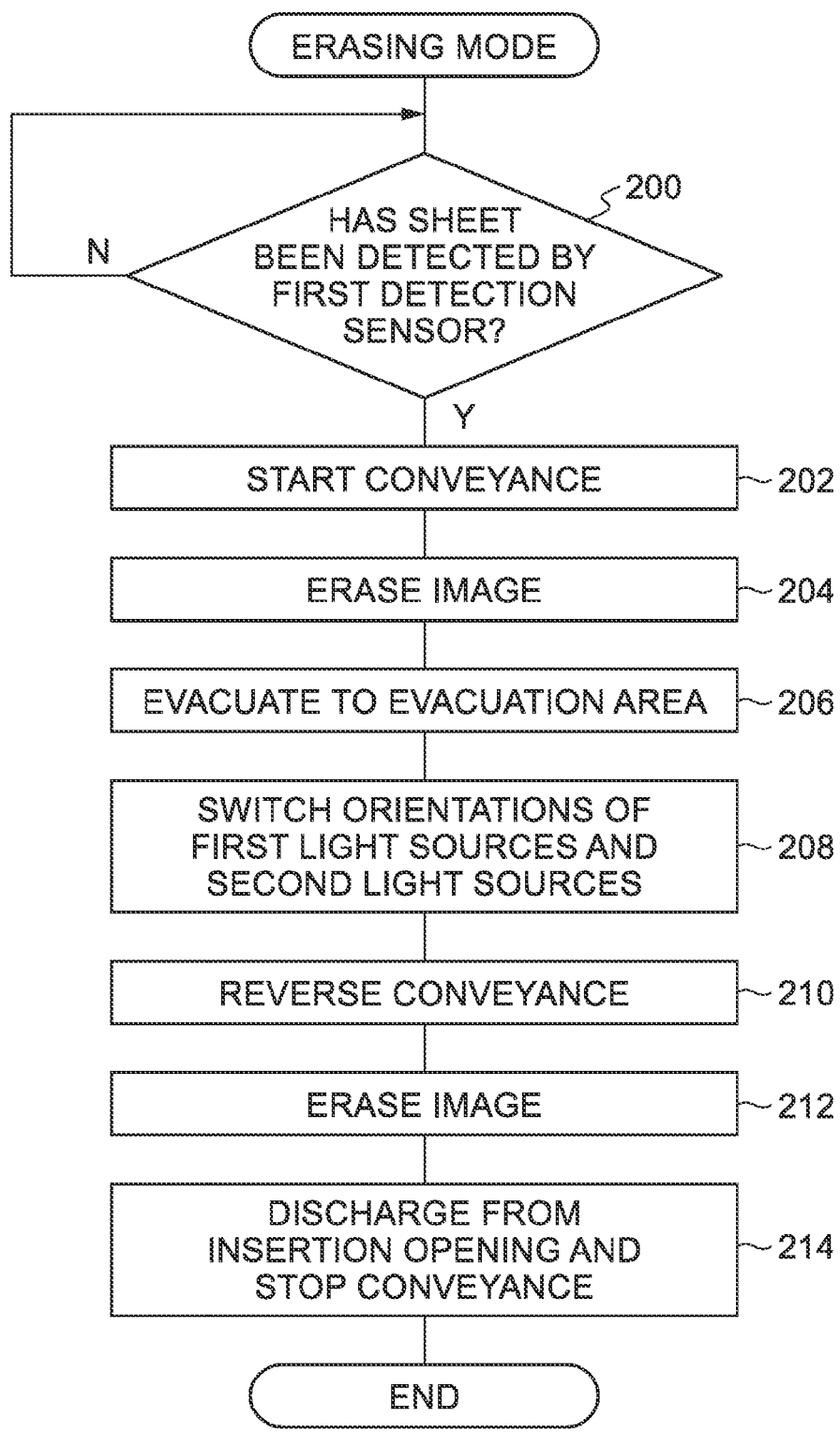
FIG. 6 is a flowchart of processing executed by the CPU of the radiographic image reading and erasing device pertaining to the first embodiment.

FIG. 5 shows processing executed in a case where the image reading and erasing mode has been selected by the user. FIG. 6 shows processing executed in a case where the erasing mode has been selected by the user. First, the processing in the image reading and erasing mode will be described.

The user inserts the storage phosphor sheet P into the insertion opening 12 in the case of reading and erasing the radiographic image stored and recorded in the storage phosphor sheet P.

Then, as shown in FIG. 5, in step 100, the CPU 30A judges whether or not the storage phosphor sheet P has been detected by the first detection sensor 22. In a case where the storage phosphor sheet P has been detected by the first detection sensor 22, the CPU 30A moves to step 102. In case where the storage phosphor sheet P has not been detected by the first detection sensor 22, the CPU 30A stands by until the storage phosphor sheet P is detected by the first detection sensor 22.

In step 102, the CPU 30A drives the conveyance rollers 20 in such a way that the storage phosphor sheet P that has been inserted is conveyed in the direction of arrow A.

In step 104, the CPU 30A drives the scanning optical system 14 in such a way that the excitation light L1 is applied to the storage phosphor sheet P that has been conveyed. Because of this, the excitation light L1 is applied to the storage phosphor sheet P while the storage phosphor sheet P is conveyed in the direction of arrow A, and the storage phosphor sheet P is photostimulated and emits light.

In step 106, the CPU 30A controls the image reading component 16 to detect and photoelectrically convert the photostimulated luminescence light L2 emitted from the storage phosphor sheet P to thereby read the image. Because of this, the image reading component 16 sequentially photoelectrically converts the photostimulated luminescence light L2 emitted from the storage phosphor sheet P to generate image data. The image data that have been generated are stored in the secondary storage component 34.

When the excitation light L1 of a sufficient intensity is applied when the radiographic image is read from the storage phosphor sheet P, the stored radiation energy corresponding to the radiographic image that had been recorded is released to the outside and should disappear, but in actuality the stored radiation energy cannot be completely erased by only the excitation light L1 that is applied at the time of the reading.

For this reason, in step 108, the CPU 30A controls the eraser 18 in such a way that the radiographic image remaining in the storage phosphor sheet P is erased by the eraser 18. Specifically, as shown in FIG. 4A, the CPU 30A drives the plural first drive motors 42A and the plural second drive motors 42B to rotate in such a way that the orientations of the plural first light sources 40A and the plural second light sources 40B become angles corresponding to the light quantity ratio b/a of the light amount b of the second erase light 44B with respect to the light amount a of the first erase light 44A. Because of this, the erase light is applied in the order of the short-wavelength first erase light 44A and the long-wavelength second erase light 44B and in the light amount ratio b/a while the storage phosphor sheet P is conveyed in the direction of arrow A, and the radiographic image stored and recorded in the storage phosphor sheet P is erased.

In step 110, the CPU 30A judges whether or not the storage phosphor sheet P is being detected by both the first detection sensor 22 and the second detection sensor 24, that is, whether or not the storage phosphor sheet P has a length exceeding the length X. Then, in a case where the storage phosphor sheet P has a length equal to or less than the length X, the CPU 30A moves to step 112. In a case where the storage phosphor sheet P has a length exceeding the length X, the CPU 30A moves to step 118.

In the present embodiment, a case has been described where the CPU 30A judges that the storage phosphor sheet P has a length exceeding the length X in a case where the storage phosphor sheet P is being detected by both the first detection sensor 22 and the second detection sensor 24, but the embodiment may also be configured in such a way that the CPU 30A calculates the length of the storage phosphor sheet P on the basis of the amount of elapsed time from the time when the storage phosphor sheet P was detected by the first detection sensor 22 to until the storage phosphor sheet P is no longer detected by the first detection sensor 22 and the conveyance speed of the storage phosphor sheet P and judges whether or not the length is a length exceeding the length X.

In step 112, the CPU 30A switches the conveyance path in such a way as to cause the storage phosphor sheet P to be evacuated to the evacuation area 26.

In step 114, the CPU 30A reverses the rotation of the conveyance rollers 20 in such a way that the conveyance direction of the storage phosphor sheet P is reversed, that is, in such a way that the storage phosphor sheet P is conveyed in the direction of arrow B.

In step 116, the CPU 30A causes the storage phosphor sheet P to be conveyed in the direction of arrow B and discharged from the insertion opening 12 and thereafter stops the conveyance by stopping the driving of the conveyance rollers 20. Whether or not the storage phosphor sheet P has been discharged from the insertion opening 12 can be detected by whether or not the storage phosphor sheet P is no longer detected after it has been detected by the first detection sensor 22, for example.

In a case where it has been judged in step 110 that the storage phosphor sheet P has a length exceeding the length X, in step 118 the CPU 30A causes the storage phosphor sheet P to be conveyed as is in the direction of arrow A and discharged from the discharge opening 38 and thereafter stops the conveyance by stopping the driving of the conveyance rollers 20. Whether or not the storage phosphor sheet P has been discharged from the discharge opening 38 can be detected by whether or not the storage phosphor sheet P is no longer detected after it has been detected by the second detection sensor 24, for example.

Next, the operation in a case where the erasing mode has been selected by the user will be described. In the present embodiment, in the erasing mode, the storage phosphor sheet P is evacuated to the evacuation area 26 after the radiographic image stored and recorded in the storage phosphor sheet P has been erased, so the storage phosphor sheet P equal to or less than the length X is the processing target.

The user inserts the storage phosphor sheet P into the insertion opening 12 in the case of erasing the radiographic image stored and recorded in the storage phosphor sheet P equal to or less than the length X.

Then, as shown in FIG. 6, in step 200, the CPU 30A judges whether or not the storage phosphor sheet P has been detected by the first detection sensor 22. In a case where the storage phosphor sheet P has been detected by the first detection sensor 22, the CPU 30A moves to step 202. In case where the storage phosphor sheet P has not been detected by the first detection sensor 22, the CPU 30A stands by until the storage phosphor sheet P is detected by the first detection sensor 22.

In step 202, like the processing of step 102 of FIG. 5, the CPU 30A drives the conveyance rollers 20 in such a way that the storage phosphor sheet P that has been inserted is conveyed in the direction of arrow A.

In step 204, like the processing of step 108 of FIG. 5, the CPU 30A controls the eraser 18 in such a way that the radiographic image remaining in the storage phosphor sheet P is erased by the eraser 18.

In step 206, like the processing of step 112 of FIG. 5, the CPU 30A switches the conveyance path in such a way as to cause the storage phosphor sheet P to be evacuated to the evacuation area 26.

In step 208, the CPU 30A drives the plural first drive motors 42A and the plural second drive motors 42B in such a way that the orientations of the plural first light sources 40A and the plural second light sources 40B switch from the state shown in FIG. 4A to the state shown in FIG. 4B. That is, the CPU 30A drives the plural first drive motors 42A and the plural second drive motors 42B to rotate in such a way that, as shown in FIG. 4B, the orientations of the plural first light sources 40A and the plural second light sources 40B in the direction of arrow B become angles corresponding to the light amount ratio b/a of the light amount b of the second erase light 44B with respect to the light amount a of the first erase light 44A. Because of this, the erase light is applied in the order of the short-wavelength first erase light 44A and the long-wavelength second erase light 44B and in the light amount ratio b/a while the storage phosphor sheet P is conveyed in the direction of arrow B, and the radiographic image remaining in the storage phosphor sheet P is erased.

In step 210, like the processing of step 114 of FIG. 5, the CPU 30A reverses the rotation of the conveyance rollers 20 in such a way that the conveyance direction of the storage phosphor sheet P is reversed.

In step 212, like the processing of step 204, the CPU 30A controls the eraser 18 in such a way that the radiographic image remaining in the storage phosphor sheet P is erased by the eraser 18.

In step 214, like the processing of step 116 of FIG. 5, the CPU 30A causes the storage phosphor sheet P to be conveyed in the direction of arrow B and discharged from the insertion opening 12 and thereafter stops the conveyance by stopping the driving of the conveyance rollers 20.

In this way, in the present embodiment, the plural first drive motors 42A and the plural second drive motors 42B are controlled in such a way that the orientations of the first light sources 40A and the second light sources 40B switch in accordance with the conveyance direction of the storage phosphor sheet P in such a way that the short-wavelength first erase light 44A and the long-wavelength second erase light 44B are applied in this order to the storage phosphor sheet P. Further, the first light sources 40A and the second light sources 40B are placed alternately at an identical height with respect to the storage phosphor sheet P. Because of this, the radiographic image can be erased in accordance with the conveyance direction of the storage phosphor sheet P without increasing the thickness of the radiographic image reading and erasing device 10. For this reason, even a conventional radiographic image reading and erasing device that does not correspond to conveyance directions in both directions can be made to correspond to the erasure of a radiographic image in conveyance in both directions by changing the eraser to the eraser 18 pertaining to the present embodiment.

Second Embodiment

Next, a second embodiment of the present invention will be described. Identical reference signs will be given to portions that are identical to those in the first embodiment, and detailed description of those identical portions will be omitted.

Figure 7A:
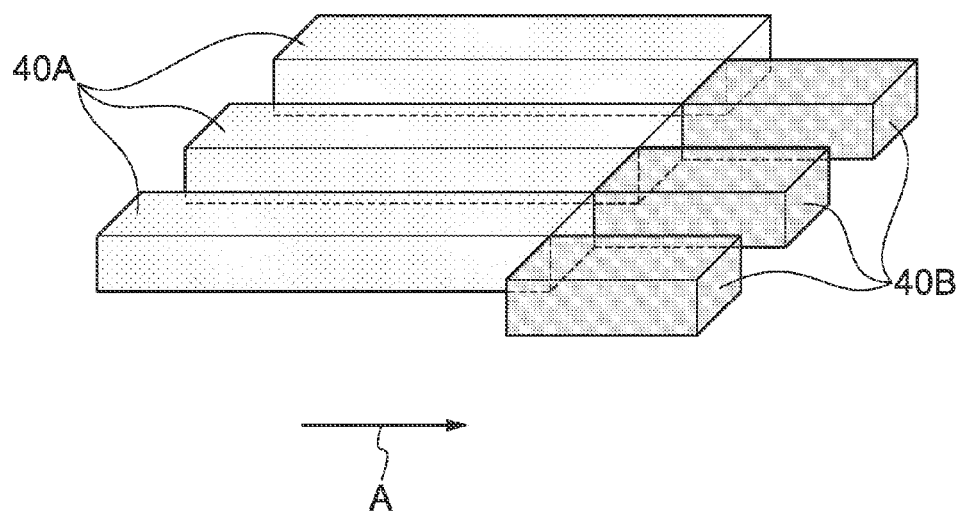
FIGS. 7A and 7B are perspective views of an eraser pertaining to a second embodiment.
Figure 7B:
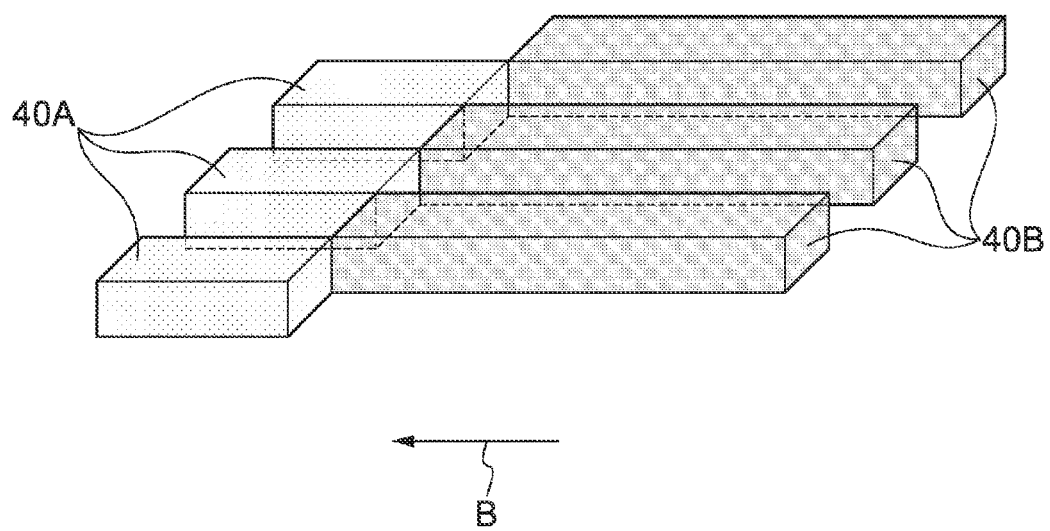
Figure 8A:
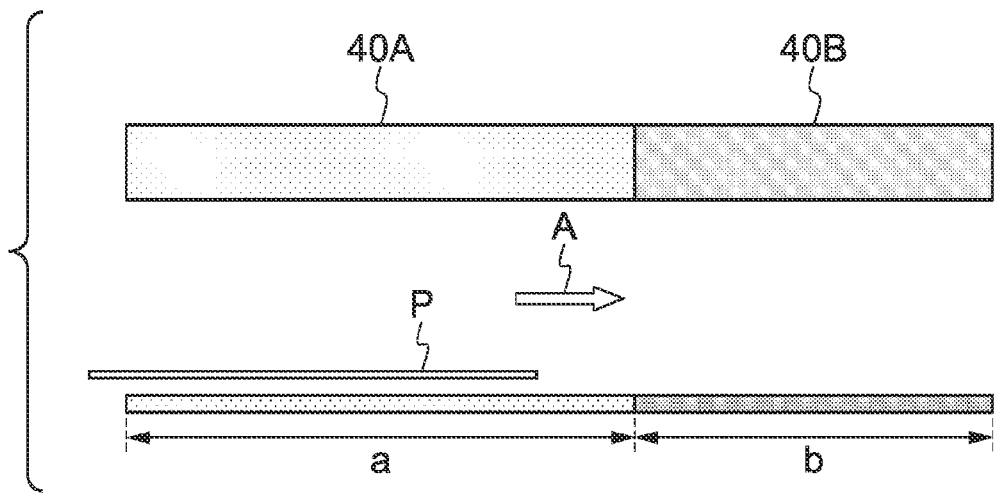
FIGS. 8A and 8B are side views of the eraser pertaining to the second embodiment.
Figure 8B:
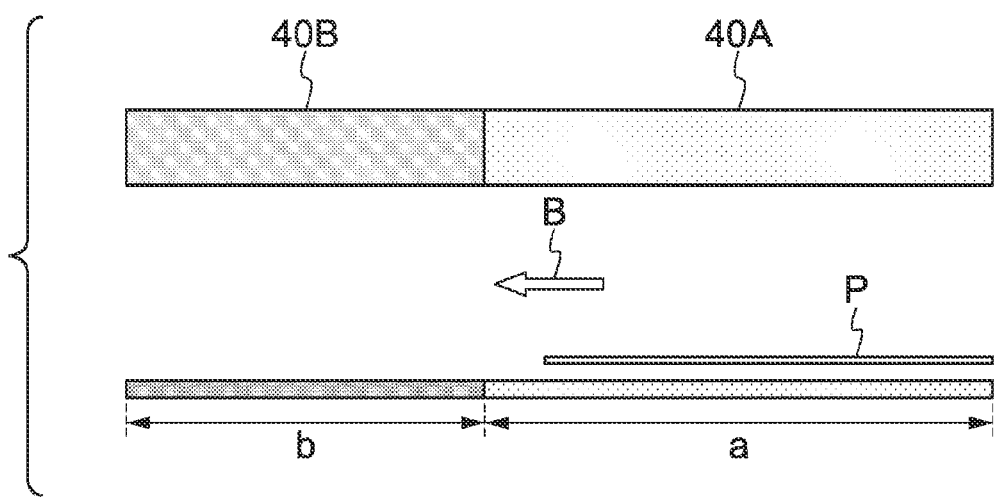

FIGS. 7A and 7B are perspective views of the eraser 18 pertaining to the present embodiment, and FIGS. 8A and 8B are side views of the eraser 18 pertaining to the present embodiment. As shown in FIG. 7A, the eraser 18 has a configuration in which the rectangular strip-like plural first light sources 40A and plural second light sources 40B that take as their lengthwise direction the direction of arrow A, which is the conveyance direction of the storage phosphor sheet P, are placed alternately in a direction that intersects (in the present embodiment, a direction that is orthogonal to) the direction of arrow A.

Further, the length of the plural first light sources 40A and the plural second light sources 40B in the direction of arrow A is a length corresponding to the area ratio b/a of the area of the region b in which the second erase light 44B is applied with respect to the area of the region a in which the first erase light 44A, which is applied from the first light sources 40A, is applied, that is, the light amount ratio b/a of the light amount b of the second erase light 44B with respect to the light amount a of the first erase light 44A.

Further, as shown in FIGS. 8A and 8B, the height of the plural first light sources 40A and the plural second light sources 40B with respect to the storage phosphor sheet P is an identical height.

Figure 10A:
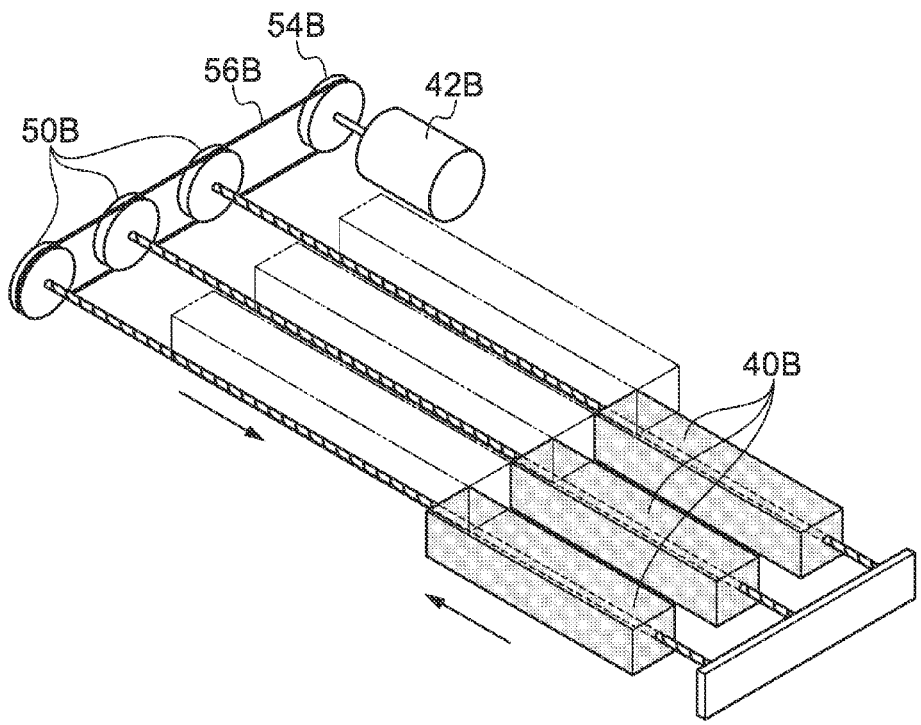
FIGS. 10A and 10B are perspective views of the eraser pertaining to the second embodiment.
Figure 10B:
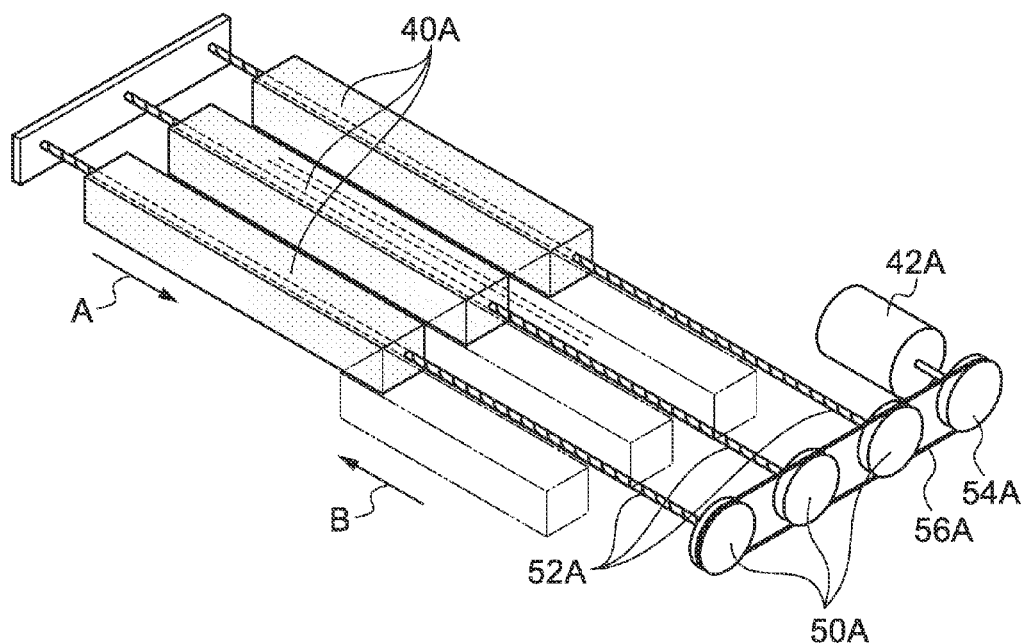

FIG. 9 is a plan view of drive mechanisms that drive the plural first light sources 40A and the plural second light sources 40B. FIG. 10A is a perspective view of the drive mechanism that drives the plural second light sources 40B. FIG. 10B is a perspective view of the drive mechanism that drives the plural first light sources 40A.

As shown in FIG. 9 and FIG. 10B, the plural first light sources 40A are attached to screws 52A that each have one end connected to rollers 50A. Additionally, a belt 56A is wrapped around the rollers 50A, to which the screws 52A are connected, and a drive roller 54A, to which a drive shaft of the first drive motor 42A is connected. When the first drive motor 42A is driven to forwardly rotate, the rollers 50A forwardly rotate and the screws 52A forwardly rotate, whereby the plural first light sources 40A simultaneously move in the direction of arrow A. When the first drive motor 42A is driven to reversely rotate, the rollers 50A reversely rotate and the screws 52A reversely rotate, whereby the plural first light sources 40A simultaneously rotate in the direction of arrow B.

Further, as shown in FIG. 9 and FIG. 10A, the drive mechanism of the plural second light sources 40B also has the same configuration as that of the drive mechanism of the plural first light sources 40A. That is, the plural second light sources 40B are attached to screws 52B that each have one end connected to rollers 50B. Additionally, a belt 56B is wrapped around the rollers 50B, to which the screws 52B are connected, and a drive roller 54B, to which a drive shaft of the second drive motor 42B is connected. When the second drive motor 42B is driven to forwardly rotate, the rollers 50B forwardly rotate and the screws 52B forwardly rotate, whereby the plural second light sources 40B simultaneously move in the direction of arrow A. When the second drive motor 42B is driven to reversely rotate, the rollers 50B reversely rotate and the screws 52B reversely rotate, whereby the plural second light sources 40B simultaneously rotate in the direction of arrow B.

Figure 11:
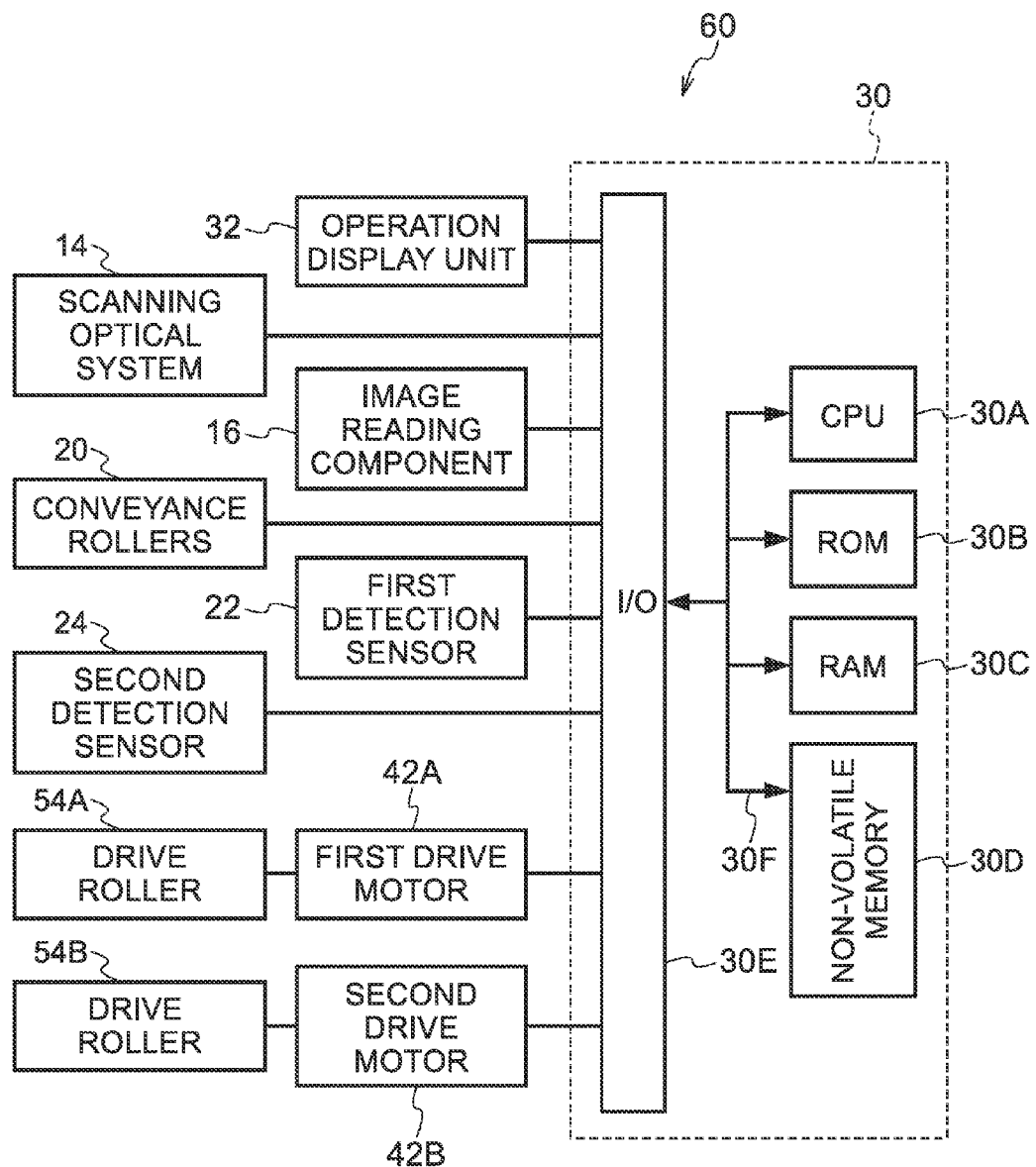
FIG. 11 is a schematic block diagram of an electrical system of a radiographic image reading and erasing device pertaining to the second embodiment.
Figure 14A:
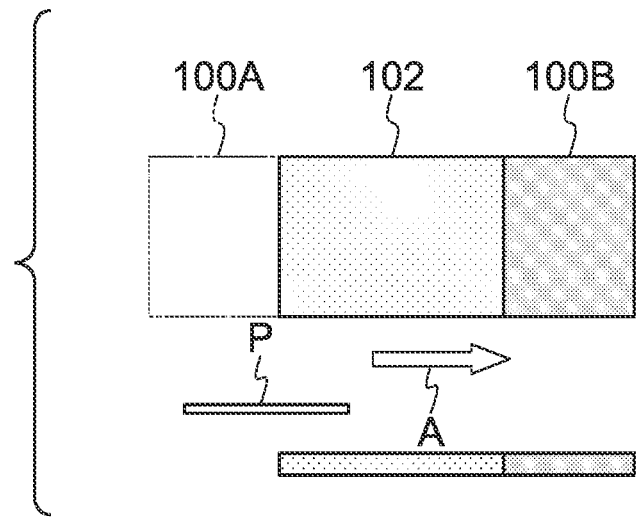
FIGS. 14A and 14B are side views of an eraser of a radiographic image reading and erasing device pertaining to a conventional example.
Figure 14B:
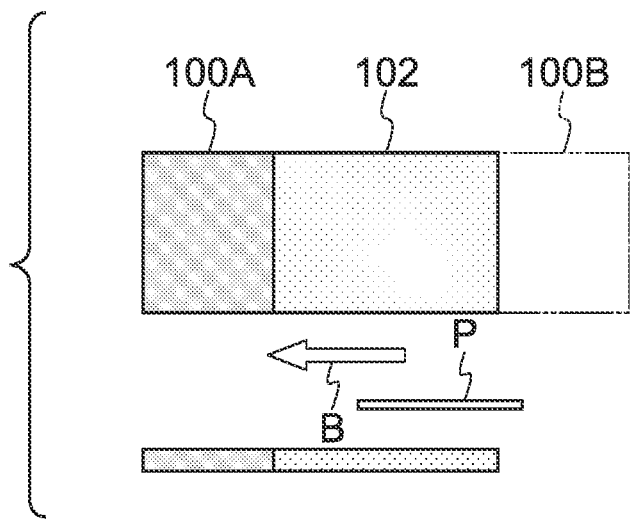
Figure 15A:
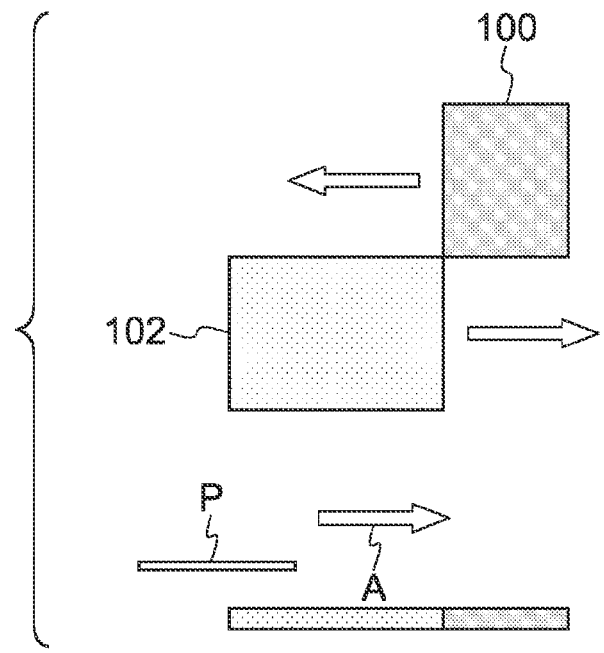
FIGS. 15A and 15B are side views of an eraser of a radiographic image reading and erasing device pertaining to a conventional example.
Figure 15B:
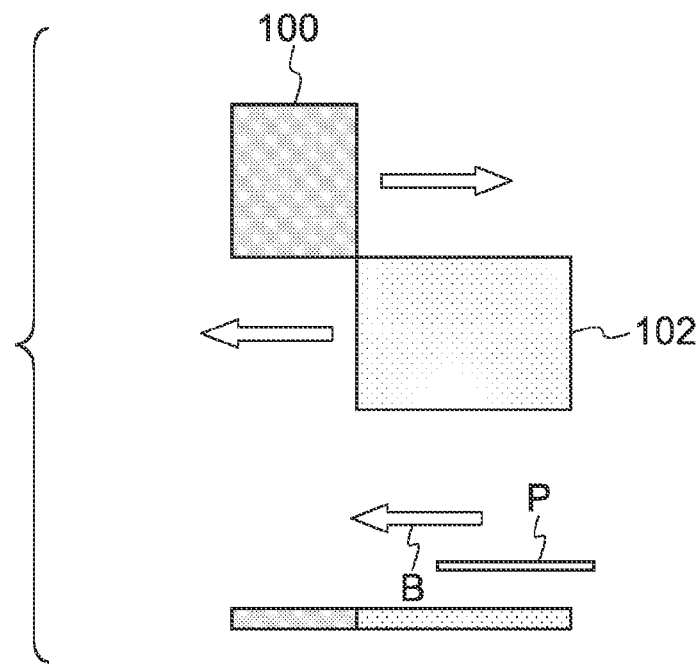

FIG. 11 is a block diagram of an electrical system of a radiographic image reading and erasing device 60 pertaining to the present embodiment. What differs from the radiographic image reading and erasing device 10 of FIG. 2 is that there are one each of the first drive motor 42A and the second drive motor 42B and they are connected to the drive rollers 54A and 54B, respectively.

In the radiographic image reading and erasing device 60, in the case of conveying the storage phosphor sheet P in the direction of arrow A and erasing the radiographic image, the first drive motor 42A and the second drive motor 42B are driven to rotate in such a way that, as shown in FIG. 8A, the first light sources 40A are placed on the upstream side in the direction of arrow A and the light sources 40B are placed on the downstream side in the direction of arrow A.

In the case of conveying the storage phosphor sheet P in the direction of arrow B and erasing the radiographic image, the first drive motor 42A and the second drive motor 42B are driven to rotate in such a way that, as shown in FIG. 8B, the first light sources 40A are placed on the upstream side in the direction of arrow B and the second light sources 40B are placed on the downstream side in the direction of arrow B.

Because of this, the first erase light and the second erase light are applied in this order and in the light amount ratio b/a to the storage phosphor sheet P, and the radiographic image is erased.

Next, processing executed by the CPU 30A of the computer 30 will be described as the action of the present embodiment.

First, the processing in the image reading and erasing mode is substantially the same as the processing shown in FIG. 5. However, when erasing the image in step 108, the first drive motor 42A and the second drive motor 42B are driven to rotate in such a way that the plural first light sources 40A and the plural second light sources 40B become placed as shown in FIG. 8A.

Further, the processing in the erasing mode is substantially the same as the processing shown in FIG. 6. However, when erasing the image in step 204, the first drive motor 42A and the second drive motor 42B are driven to rotate in such a way that the plural first light sources 40A and the plural second light sources 40B become placed as shown in FIG. 8A.

Further, in step 208, the first drive motor 42A and the second drive motor 42B are driven to cause the plural first light sources 40A to move in the direction of arrow A and to cause the plural second light sources 40B to move in the direction of arrow B in such a way that the plural first light sources 40A and the plural second light sources 40B switch from the placement shown in FIG. 8A to the placement shown in FIG. 8B.

In this way, in the present embodiment, the first drive motor 42A and the second drive motor 42B are controlled in such a way that the positions of the first light sources 40A and the second light sources 40B in the conveyance direction switch in accordance with the conveyance direction of the storage phosphor sheet P in such a way that the short-wavelength first erase light 44A and the long-wavelength second erase light 44B are applied in this order to the storage phosphor sheet P. Further, the first light sources 40A and the second light sources 40B are placed alternately at an identical height with respect to the storage phosphor sheet P. Because of this, the radiographic image can be erased in accordance with the conveyance direction of the storage phosphor sheet P without increasing the thickness of the radiographic image reading and erasing device 60. For this reason, even a conventional radiographic image reading and erasing device that does not correspond to conveyance directions in both directions can be made to correspond to the erasure of a radiographic image in conveyance in both directions by changing the eraser to the eraser 18 pertaining to the present embodiment.

In the present embodiment, the case of a configuration that causes both the first light source 40A and the second light source 40B to move simultaneously has been described, but as a configuration that causes one of the first light sources 40A and the second light sources 40B to move, the device may also be given a configuration that switches the states shown in FIGS. 8A and 8B.

Further, in the present embodiment, drive mechanisms that cause the first light sources 40A and the second light sources 40B to move by causing the screws 52A and 52B to rotate have been described as an example, but the drive mechanisms are not limited to this. For example, as shown in FIG. 12 and FIG. 13, the drive mechanisms may also be given a configuration in which the first light sources 40A are moved in the direction of arrow A or the direction of arrow B by a conveyor belt 62A and the second light sources 40B are caused to move in the direction of arrow A or the direction of arrow B by a conveyor belt 62B.

In each of the above-described embodiments, a configuration equipped with a plurality of each of the first light sources 40A and the second light sources 40B was described, but as long as the device can apply the first erase light 44A and the second erase light 44B in the light amount ratio b/a to the storage phosphor sheet P, the device may also be given a configuration equipped with one each of the first light source 40A and the second light source 40B.

Further, in each of the above-described embodiments, a case was described where erase light of two types of wavelengths is applied to the storage phosphor sheet P, but the device may also be given a configuration in which erase light of three or more types of wavelengths is applied to the storage phosphor sheet P in order beginning with the erase light of the short wavelength.

Further, the configuration of the radiographic image reading and erasing device 10 described in the first embodiment (see FIG. 1 and FIG. 2) is an example, and it goes without saying that unnecessary portions may be deleted therefrom and new portions may be added thereto without departing from the gist of the present invention.

Further, the flows of the processing of the control program described in the first embodiment (see FIG. 5 and FIG. 6) are also an example, and it goes without saying that unnecessary steps may be deleted therefrom and new steps may be added thereto without departing from the gist of the present invention.

According to this invention, the controller controls the drive mechanisms in accordance with the conveyance direction of the storage phosphor sheet in such a way that the short-wavelength first erase light and the long-wavelength second erase light are applied in this order to the storage phosphor sheet. Further, the first light source and the second light source are placed at an identical height, so the radiographic image can be erased in accordance with the conveyance direction of the storage phosphor sheet without increasing the thickness of the device.

In a second aspect of the invention, the radiographic image erasing device may be configured in such a way that the first light source and the second light source are light sources that are long in an intersecting direction that intersects the conveyance direction of the storage phosphor sheet, the drive mechanisms are rotational drive mechanisms that drive the first light source and the second light source to rotate taking the intersecting direction as an axis of rotation, and the controller controls the rotational drive mechanisms in such a way that the respective directions along the conveyance direction in which the first erase light and the second erase light are applied switch in accordance with the conveyance direction of the storage phosphor sheet.

Further, in a third aspect of the invention, the radiographic image erasing device may be given a configuration equipped with a plurality of each of the first light source and the second light source.

Further, in a fourth aspect of the invention, the radiographic image erasing device may be configured in such a way that the controller controls the rotational drive mechanisms in such a way that the angles of rotation of the plural first light sources and the plural second light sources switch in accordance with a light amount ratio between the first erase light and the second erase light.

Further, in a fifth aspect of the invention, the radiographic image erasing device may be given a configuration in which the plural first light sources and the plural second light sources are placed alternately in a direction along the conveyance direction.

Further, in a sixth aspect of the invention, the radiographic image erasing device may be configured in such a way that the first light source and the second light source are light sources that are long in a direction along the conveyance direction of the storage phosphor sheet, the drive mechanisms are moving mechanisms that cause at least one of the first light source and the second light source to move in the conveyance direction, and the controller controls the moving mechanisms in such a way that the positions of the first light source and the second light source in the conveyance direction switch in accordance with the conveyance direction of the storage phosphor sheet.

Further, in a seventh aspect of the invention, the radiographic image erasing device may be given a configuration in which the length of the first light source and the second light source in a direction along the conveyance direction is a length corresponding to a light amount ratio between the first erase light and the second erase light.

Further, in an eighth aspect of the invention, the radiographic image erasing device may be given a configuration equipped with a plurality of each of the first light source and the second light source.

Further, in a ninth aspect of the invention, the radiographic image erasing device may be given a configuration in which the plural first light sources and the plural second light sources are placed alternately in an intersecting direction that intersects the conveyance direction.

Further, in a twelfth aspect of the invention, the radiographic image reading and erasing device may further include a detection component that detects the length of the storage phosphor sheet that has been inserted from the insertion opening and an evacuation mechanism that causes the storage phosphor sheet equal to or less than a predetermined length to be evacuated to an evacuation area, wherein in a case where the length of the storage phosphor sheet that has been detected by the detection component is equal to or less than the predetermined length, the conveyance controller controls the conveyance mechanism in such a way as to cause the storage phosphor sheet from which the radiographic image has been erased by the radiographic image erasing device to be evacuated to the evacuation area and thereafter reverse the conveyance direction to cause the storage phosphor sheet to be discharged from the insertion opening, and in a case where the storage phosphor sheet exceeds the predetermined length, the conveyance controller controls the conveyance mechanism in such a way as to cause the storage phosphor sheet to be discharged from a discharge opening disposed on the opposite side of the insertion opening.

Further, in a thirteenth aspect of the invention, the radiographic image reading and erasing device may be configured to again erase the radiographic image stored and recorded in the storage phosphor sheet when the storage phosphor sheet equal to or less than the predetermined length returns to the insertion opening from the evacuation area.

According to the present invention, the invention has the effect that it can erase a radiographic image in accordance with the conveyance direction of the storage phosphor sheet without increasing the thickness of the device.

What is claimed is:

1. A radiographic image erasing device comprising:
   a first light source that applies first erase light including a wavelength component in the ultraviolet region to a storage phosphor sheet in which a radiographic image has been stored and recorded;
   a second light source that is placed at a height identical to that of the first light source with respect to the storage phosphor sheet and applies second erase light including a wavelength component of a longer wavelength than that of the wavelength component of the first erase light to the storage phosphor sheet to which the first erase light has been applied by the first light source;
   drive mechanisms that switch the orientations or positions of the first light source and the second light source; and
   a controller that controls the drive mechanisms in accordance with a conveyance direction of the storage phosphor sheet such that the first erase light and the second erase light are applied in this order to the storage phosphor sheet.

2. The radiographic image erasing device according to claim 1, wherein
   the first light source and the second light source are light sources that are long in an intersecting direction that intersects the conveyance direction of the storage phosphor sheet,
   the drive mechanisms are rotational drive mechanisms that drive the first light source and the second light source to rotate taking the intersecting direction as an axis of rotation, and
   the controller controls the rotational drive mechanisms such that the respective directions along the conveyance direction in which the first erase light and the second erase light are applied switch in accordance with the conveyance direction of the storage phosphor sheet.

3. The radiographic image erasing device according to claim 2, wherein the radiographic image erasing device is equipped with a plurality of each of the first light source and the second light source.

4. The radiographic image erasing device according to claim 3, wherein the controller controls the rotational drive mechanisms such that the angles of rotation of the plural first light sources and the plural second light sources switch in accordance with a light amount ratio between the first erase light and the second erase light.

5. The radiographic image erasing device according to claim 3, wherein the plural first light sources and the plural second light sources are placed alternately in a direction along the conveyance direction.

6. The radiographic image erasing device according to claim 4, wherein the plural first light sources and the plural second light sources are placed alternately in a direction along the conveyance direction.

7. The radiographic image erasing device according to claim 1, wherein the first light source and the second light source are light sources that are long in a direction along the conveyance direction of the storage phosphor sheet, the drive mechanisms are moving mechanisms that cause at least one of the first light source and the second light source to move in the conveyance direction, and the controller controls the moving mechanisms such that the positions of the first light source and the second light source, in the conveyance direction, switch in accordance with the conveyance direction of the storage phosphor sheet.

8. The radiographic image erasing device according to claim 2, wherein the first light source and the second light source are light sources that are long in a direction along the conveyance direction of the storage phosphor sheet, the drive mechanisms are moving mechanisms that cause at least one of the first light source and the second light source to move in the conveyance direction, and the controller controls the moving mechanisms such that the positions of the first light source and the second light source, in the conveyance direction, switch in accordance with the conveyance direction of the storage phosphor sheet.

9. The radiographic image erasing device according to claim 7, wherein the length of the first light source and the second light source in a direction along the conveyance direction is a length corresponding to a light amount ratio between the first erase light and the second erase light.

10. The radiographic image erasing device according to claim 8, wherein the length of the first light source and the second light source in a direction along the conveyance direction is a length corresponding to a light amount ratio between the first erase light and the second erase light.

11. The radiographic image erasing device according to claim 7, wherein the radiographic image erasing device is equipped with a plurality of each of the first light source and the second light source.

12. The radiographic image erasing device according to claim 9, wherein the radiographic image erasing device is equipped with a plurality of each of the first light source and the second light source.

13. The radiographic image erasing device according to claim 11, wherein the plural first light sources and the plural second light sources are placed alternately in an intersecting direction that intersects the conveyance direction.

14. The radiographic image erasing device according to claim 12, wherein the plural first light sources and the plural second light sources are placed alternately in an intersecting direction that intersects the conveyance direction.

15. A radiographic image reading and erasing device comprising:

a conveyance mechanism that conveys a storage phosphor sheet that has been inserted from an insertion opening;

a reading component that reads a radiographic image from the storage phosphor sheet;

the radiographic image erasing device according to claim 1 which erases the radiographic image remaining in the storage phosphor sheet after the radiographic image has been read by the reading component; and a conveyance controller that controls the conveyance mechanism.

16. The radiographic image reading and erasing device according to claim 15, further comprising a detection component that detects the length of the storage phosphor sheet that has been inserted from the insertion opening and an evacuation mechanism that causes the storage phosphor sheet equal to or less than a predetermined length to be evacuated to an evacuation area, wherein in a case where the length of the storage phosphor sheet that has been detected by the detection component is equal to or less than the predetermined length, the conveyance controller controls the conveyance mechanism so as to cause the storage phosphor sheet from which the radiographic image has been erased by the radiographic image erasing device to be evacuated to the evacuation area and thereafter reverse the conveyance direction to cause the storage phosphor sheet to be discharged from the insertion opening, and in a case where the storage phosphor sheet exceeds the predetermined length, the conveyance controller controls the conveyance mechanism so as to cause the storage phosphor sheet to be discharged from a discharge opening disposed on the opposite side of the insertion opening.

17. The radiographic image reading and erasing device according to claim 16, wherein the radiographic image erasing device again erases the radiographic image stored and recorded in the storage phosphor sheet when the storage phosphor sheet equal to or less than the predetermined length returns to the insertion opening from the evacuation area.

18. A non-transitory computer-readable storage medium storing a radiographic image erasing program for a radiographic image erasing device comprising a first light source that applies first erase light including a wavelength component in the ultraviolet region to a storage phosphor sheet in which a radiographic image has been stored and recorded, a second light source that is placed at a height identical to that of the first light source with respect to the storage phosphor sheet and applies second erase light including a wavelength component of a longer wavelength than that of the wavelength component of the first erase light to the storage phosphor sheet to which the first erase light has been applied by the first light source, and drive mechanisms that switch the orientations or positions of the first light source and the second light source, the radiographic image erasing program causing a processor to control the drive mechanisms in accordance with a conveyance direction of the storage phosphor sheet such that the first erase light and the second erase light are applied in this order to the storage phosphor sheet.

19. The non-transitory computer-readable storage medium according to claim 18, wherein the first light source and the second light source are light sources that are long in an intersecting direction that intersects the conveyance direction of the storage phosphor sheet, the drive mechanisms are rotational drive mechanisms that drive the first light source and the second light source to rotate taking the intersecting direction as an axis of rotation, and the radiographic image erasing program causes the processor to control the rotational drive mechanisms such that the respective directions along the conveyance direction in which the first erase light and the second erase light are applied switch in accordance with the conveyance direction of the storage phosphor sheet.

20. The non-transitory computer-readable storage medium according to claim 18, wherein the first light source and the second light source are light sources that are long in a direction along the conveyance direction of the storage phosphor sheet, the drive mechanisms are moving mechanisms that cause at least one of the first light source and the second light source to move in the conveyance direction, and the radiographic image erasing program causes the processor to control the moving mechanisms such that the positions of the first light source and the second light source, in the conveyance direction, switch in accordance with the conveyance direction of the storage phosphor sheet.

\* \* \* \* \*